United States Patent
Yang et al.

(10) Patent No.: US 9,381,580 B2
(45) Date of Patent: Jul. 5, 2016

(54) MILLING METHOD FOR MACHINING METALLIC MEMBER

(71) Applicants: FU DING ELECTRONICAL TECHNOLOGY (JIASHAN) CO., LTD., Zhejiang (CN); HON HAI PRECISION INDUSTRY CO., LTD., New Taipei (TW)

(72) Inventors: Ming-Lu Yang, New Taipei (TW); Tian-En Zhang, Jiashan (CN); Wei-Chuan Zhang, Jiashan (CN); Jian-Shi Jia, Jiashan (CN); Yang-Mao Peng, Jiashan (CN); Jian Qu, Jiashan (CN); Feng-Hua Chen, Jiashan (CN); Zhen-Guang Xu, Jiashan (CN); Jing-Shuang Sui, Jiashan (CN); Da-Qing Zhuang, Jiashan (CN); Jie Li, Jiashan (CN); Yi Liu, Jiashan (CN); Jian-Min Yu, Jiashan (CN)

(73) Assignees: FU DING ELECTRONICAL TECHNOLOGY (JIASHAN) CO., LTD., Zhejiang (CN); HON HAI PRECISION INDUSTRY CO., LTD., New Taipei (TW)

( * ) Notice: Subject to any disclaimer, the term of this patent is extended or adjusted under 35 U.S.C. 154(b) by 306 days.

(21) Appl. No.: 14/070,736

(22) Filed: Nov. 4, 2013

(65) Prior Publication Data
US 2014/0169901 A1    Jun. 19, 2014

(30) Foreign Application Priority Data
Dec. 19, 2012    (CN) .......................... 2012 1 0553654

(51) Int. Cl.
B23C 1/14    (2006.01)
B23C 3/12    (2006.01)
(Continued)

(52) U.S. Cl.
CPC . *B23C 3/12* (2013.01); *B23C 1/002* (2013.01); *B23C 1/005* (2013.01); *B23C 1/14* (2013.01);
(Continued)

(58) Field of Classification Search
CPC ............. Y10T 409/30896; Y10T 409/303808; Y10T 409/303752; Y10T 409/304144; Y10T 409/305656; Y10T 409/308288; Y10T 409/305824; Y10T 409/307728; B23C 3/12; B23C 3/16; B23C 2215/00; B23C 2220/16; B23C 2220/20; B23C 1/002; B23C 1/005; B23C 1/14; B23C 3/00; B23C 3/02; B23C 3/04
See application file for complete search history.

(56) References Cited

U.S. PATENT DOCUMENTS 3,413,893 A * 12/1968 Wilson ...................... B23C 1/12
409/201

(Continued)

FOREIGN PATENT DOCUMENTS

CN    101959639 A    1/2011
CN    202192431 U    4/2012
(Continued)

*Primary Examiner* — Daniel Howell
*Assistant Examiner* — Yasir Diab
(74) *Attorney, Agent, or Firm* — ScienBiziP, P.C.

(57) ABSTRACT

A milling method for machining a metallic member to provide a finished appearance is provided. A metallic member is positioned on a worktable. The metallic member includes a top portion and a peripheral sidewall. The peripheral sidewall includes an end edge. After rotation, the milling cutter is rotated and resists the peripheral sidewall of the metallic member. The milling cutter is moved along a predetermined path, and the milling cutter machines the metallic member to achieve a required shape and finish. The worktable rotates the metallic member to enable the end edge of the peripheral sidewall to face the milling cutter, and the milling cutter chamfers the end edge along a predetermined path, while simultaneously controlling a feed of the milling cutter relative to the metallic member.

15 Claims, 8 Drawing Sheets

(51) Int. Cl.
  *B23C 3/02* (2006.01)
  *B23C 3/04* (2006.01)
  *B23C 1/00* (2006.01)

(52) U.S. Cl.
  CPC ... *B23C 3/02* (2013.01); *B23C 3/04* (2013.01); *B23C 2215/00* (2013.01); *B23C 2220/16* (2013.01); *B23C 2220/20* (2013.01); *Y10T 409/303808* (2015.01); *Y10T 409/304144* (2015.01); *Y10T 409/305656* (2015.01); *Y10T 409/305824* (2015.01); *Y10T 409/308288* (2015.01)

(56) References Cited

U.S. PATENT DOCUMENTS

| | | | | |
|---|---|---|---|---|
| 3,700,228 | A * | 10/1972 | Peale | B23Q 1/5437 269/57 |
| 3,998,127 | A * | 12/1976 | Romeu | B23C 1/14 408/234 |
| 5,091,861 | A * | 2/1992 | Geller | B23B 31/265 700/192 |
| 5,172,464 | A * | 12/1992 | Kitamura | B23Q 1/5406 198/346.1 |
| 6,955,345 | B2 * | 10/2005 | Kato | B23Q 1/5437 269/60 |
| 7,491,022 | B2 * | 2/2009 | Kato | B23Q 1/287 269/71 |
| 2004/0146369 | A1 * | 7/2004 | Kato | B23Q 1/5437 409/219 |
| 2006/0089089 | A1 * | 4/2006 | Kato | B23Q 1/5437 451/23 |
| 2006/0270540 | A1 | 11/2006 | Takayama et al. | |
| 2008/0056832 | A1 * | 3/2008 | Choi | B23B 39/161 408/52 |
| 2009/0160388 | A1 * | 6/2009 | Zagromski | B23Q 5/58 318/570 |
| 2010/0313718 | A1 * | 12/2010 | Meidar | B23Q 1/012 82/122 |

FOREIGN PATENT DOCUMENTS

| | | |
|---|---|---|
| EP | 1952937 A1 | 8/2008 |
| EP | 2263827 A1 | 12/2010 |
| EP | 2529881 A1 | 12/2012 |
| JP | 2004-130468 A | 4/2004 |
| TW | M427230 U1 | 4/2012 |

* cited by examiner

US 9,381,580 B2

MILLING METHOD FOR MACHINING METALLIC MEMBER

CROSS-REFERENCE TO RELATED APPLICATIONS

This application claims all benefits accruing under 35 U.S.C. §119 from China Patent Application No. 201210553654.8, filed on Dec. 19, 2012, in the China Intellectual Property Office, the disclosure of which is incorporated herein by reference. The application is also related to co-pending applications entitled, "METHOD FOR MACHINING METALLIC MEMBER USING LATHING AND MILLING" Ser. No. 14/070,671; "METHOD FOR MACHINING METALLIC MEMBER USING LATHING AND MILLING" Ser. No. 14/070,681; "METHOD FOR MACHINING METALLIC MEMBER USING LATHING AND SCRAPING" Ser. No. 14/070,688; "METHOD FOR MACHINING METALLIC MEMBER USING LATHING AND SCRAPING" Ser. No. 14/070,694; "METHOD FOR MACHINING METALLIC MEMBER USING LATHING AND SCRAPING" Ser. No. 14/070,699; "MACHINE TOOL WITH LATHE TOOL AND MILLING CUTTER" Ser. No. 14/070,705; "MACHINE TOOL WITH LATHE TOOL AND SCRAPING CUTTER" Ser. No. 14/070,717; "MACHINE CONTROL SYSTEM EMPLOYING LATHE TOOL AND MILLING CUTTER" Ser. No. 14/070,722, "MACHINE CONTROL SYSTEM EMPLOYING LATHE TOOL AND SCRAPING CUTTER" Ser. No. 14/070,728.

BACKGROUND

1. Technical Field

The present disclosure generally relates to methods for machining a metallic member, and particularly to a milling method for machining a peripheral sidewall and an end edge of a metallic member.

2. Description of the Related Art

An electronic device, such as a tabletop computer or a mobile phone, has a metallic housing. The metallic housing includes a top portion and a peripheral sidewall extending from a peripheral edge of the top portion. The peripheral sidewall includes an end edge away from the top portion. A milling machine is employed to machine a peripheral sidewall of the metallic member, then a chamfering machine is employed to chamfer the end edge. The metallic member is transferred between the milling machine and the chamfering machine. Therefore, a machining efficiency and a positioning accuracy are reduced.

Therefore, there is room for improvement within the art.

BRIEF DESCRIPTION OF THE DRAWING

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
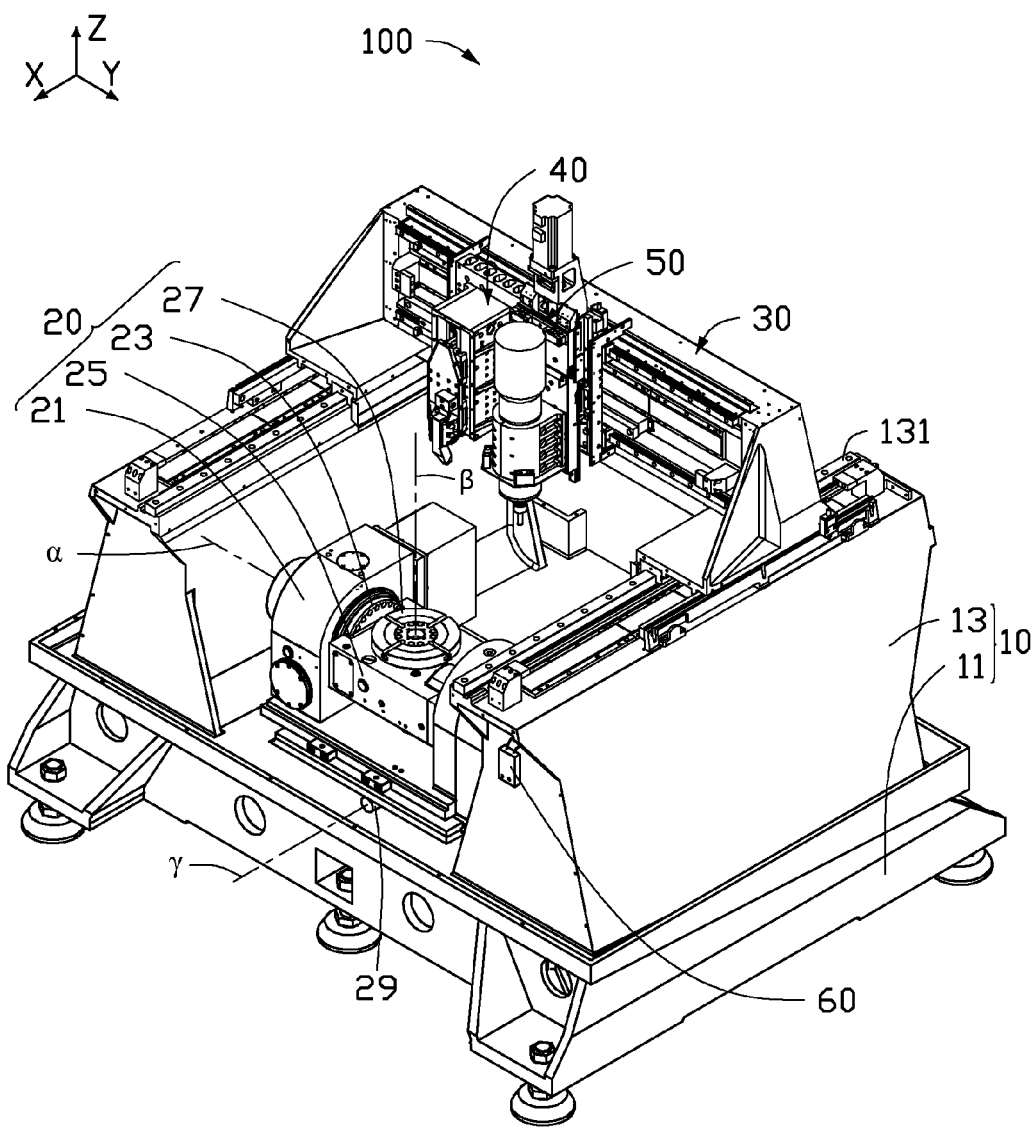
FIG. 1 is an isometric view of a first embodiment of a machine equipped with a lathe feeding mechanism and a miller feeding mechanism, and a worktable.
Figure 2:
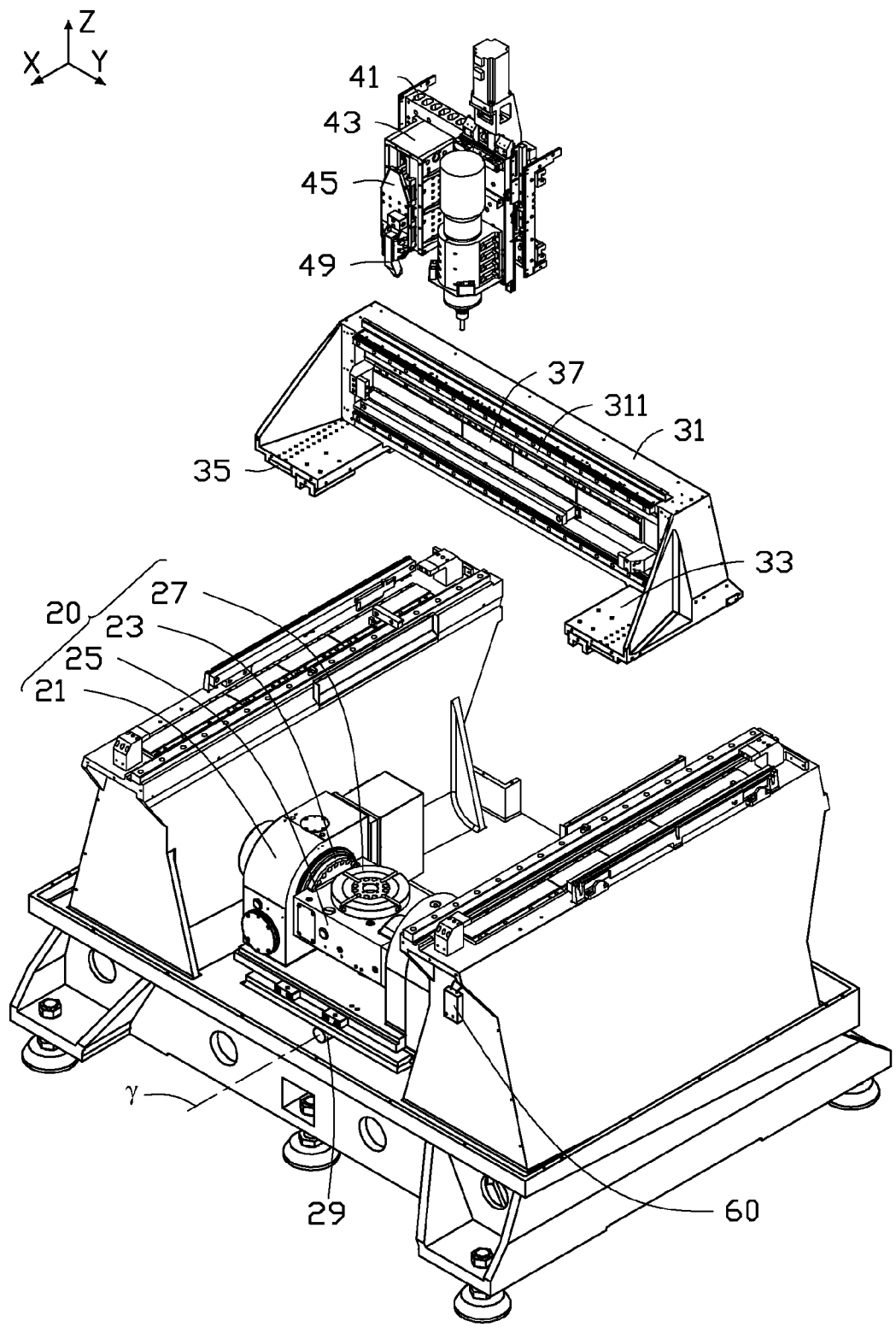
FIG. 2 is an exploded, isometric view of the machine of FIG. 1.
Figure 5:
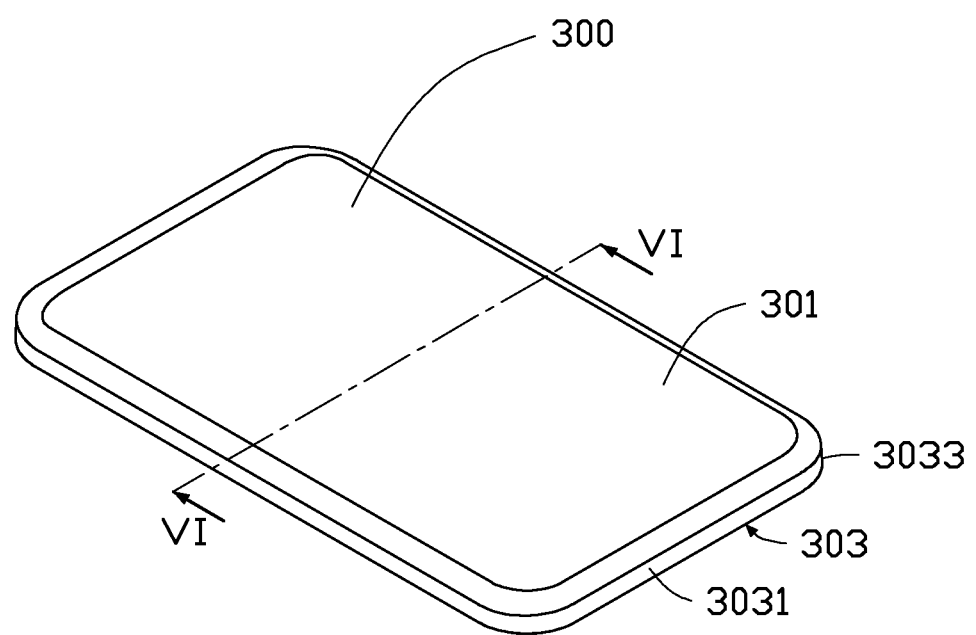
FIG. 5 is an isometric view of a metallic member to be machined.

FIGS. 1 and 2 show a first embodiment of a machine 100 adopting a milling method for machining a metallic member 300 (see FIG. 5). The machine 100 includes a machine support 10, a worktable 20, a moving device 30, a lathe feeding mechanism 40, a miller feeding mechanism 50, and a controller 60. The worktable 20 holds a workpiece in place and is supported by the machine support 10. The moving device 30 is movably positioned on the machine support 10 above the worktable 20. The lathe feeding mechanism 40 and the miller feeding mechanism 50 are arranged adjacent to each other and are slidably mounted on the moving device 30. The controller 60 is electrically connected to the worktable 20, the moving device 30, the lathe feeding mechanism 40, and the miller feeding mechanism 50 for controlling the machine 100. Under the control of the controller 60, the moving device 30 drives the lathe feeding mechanism 40 and the miller feeding mechanism 50 along miller feeding the X, Y, and Z axes of the Cartesian coordinate system.

The machine support 10 includes a base 11 and a pair of support bodies 13 positioned on the base 11. The support bodies 13 are arranged apart from each other. Each support body 13 includes a first sliding rail 131 on a surface away from the base 11. In the illustrated embodiment, the first sliding rail 131 extends substantially along an X-axis (a first direction).

The worktable 20 is rotatably positioned on the base 11 between the two support bodies 13. The worktable 20 includes a pair of mounting bases 21, a first rotating member 23, a rotating table 25, and a second rotating member 27. The pair of mounting bases 21 is located in a middle portion of the base 11 and between the two support bodies 13. The first rotating member 23 is mounted on one mounting base 21. The rotating table 25 connects the first rotating member 23 to the other mounting base 21. The first rotating member 23 is rotates the rotating table 25 around an α axis. The α axis is substantially parallel to a Y-axis (a second direction). The second rotating member 27 is positioned on a middle portion of the rotating table 25, and rotates the metallic member 300 placed thereupon around a β axis. The β axis is substantially parallel to a Z-axis (a third direction). The first rotating member 23 and the second rotating member 27 are electrically connected to the controller 60. In the illustrated embodiment, the first rotating member 23 and the second rotating member 27 are direct drive motors.

The moving device 30 is slidably mounted on the pair of support bodies 13 and is located above the worktable 20. The moving device 30 includes a cross beam 31, a pair of sliding bases 33, a pair of first driving mechanisms 35, and a second driving mechanism 37. An extending direction of the cross beam 31 is substantially parallel to the Y-axis. Opposite ends of the cross beam 31 are slidably positioned on the support bodies 13. The cross beam 31 includes a pair of second sliding rails 311 positioned on a side surface thereof and extending substantially parallel to the Y-axis. The pair of sliding bases 33 is installed on opposite ends of the cross beam 31, respectively, to slidably connect with the first sliding rail 131. The first driving mechanisms 35 is mounted on a surface of the sliding base 33 away from the cross beam 31 and located adjacent to an end of the first sliding rail 131. The pair of first driving mechanisms 35 is employed to drive the cross beam 31 to move along the X-axis direction.

The second driving mechanism 37 is mounted on the cross beam 31 to drive the lathe feeding mechanism 40 and the miller feeding mechanism 50 to move along the second sliding rails 311. The first driving mechanism 35 and the second driving mechanism 37 are electrically connected to the controller 60. In the illustrated embodiment, the first driving mechanisms 35 and the second driving mechanism 37 are linear motors. In other embodiments, the first driving mechanisms 35 and the second driving mechanism 37 may be other drivers, such as hydraulic cylinders or rams, for example. A number of the first driving mechanisms 35 and the second driving mechanism 37 may be set according to the application needs.

Figure 3:
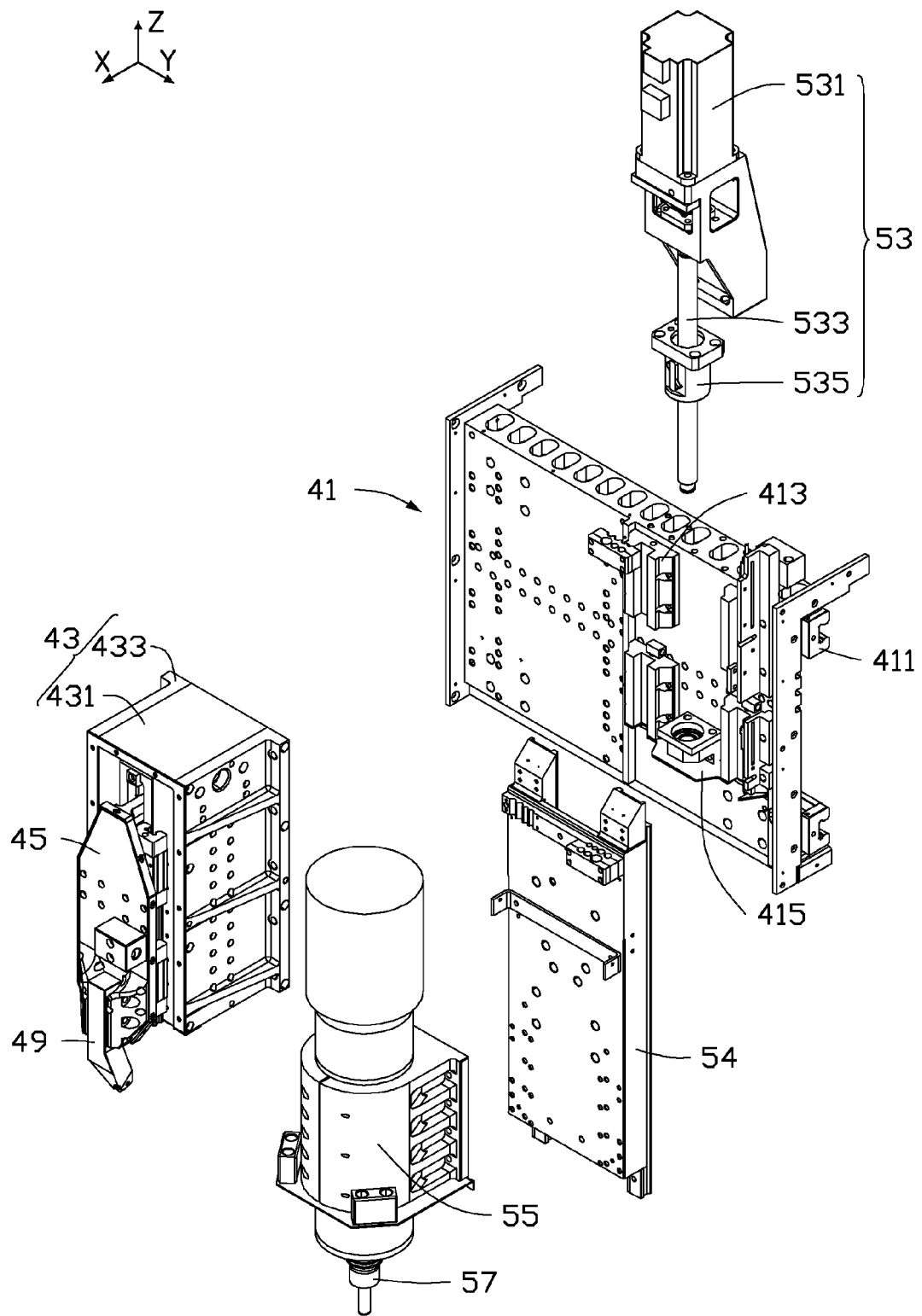
FIG. 3 is a partial, exploded, isometric view of the lathe feeding mechanism and the miller feeding mechanism of FIG. 2.
Figure 4:
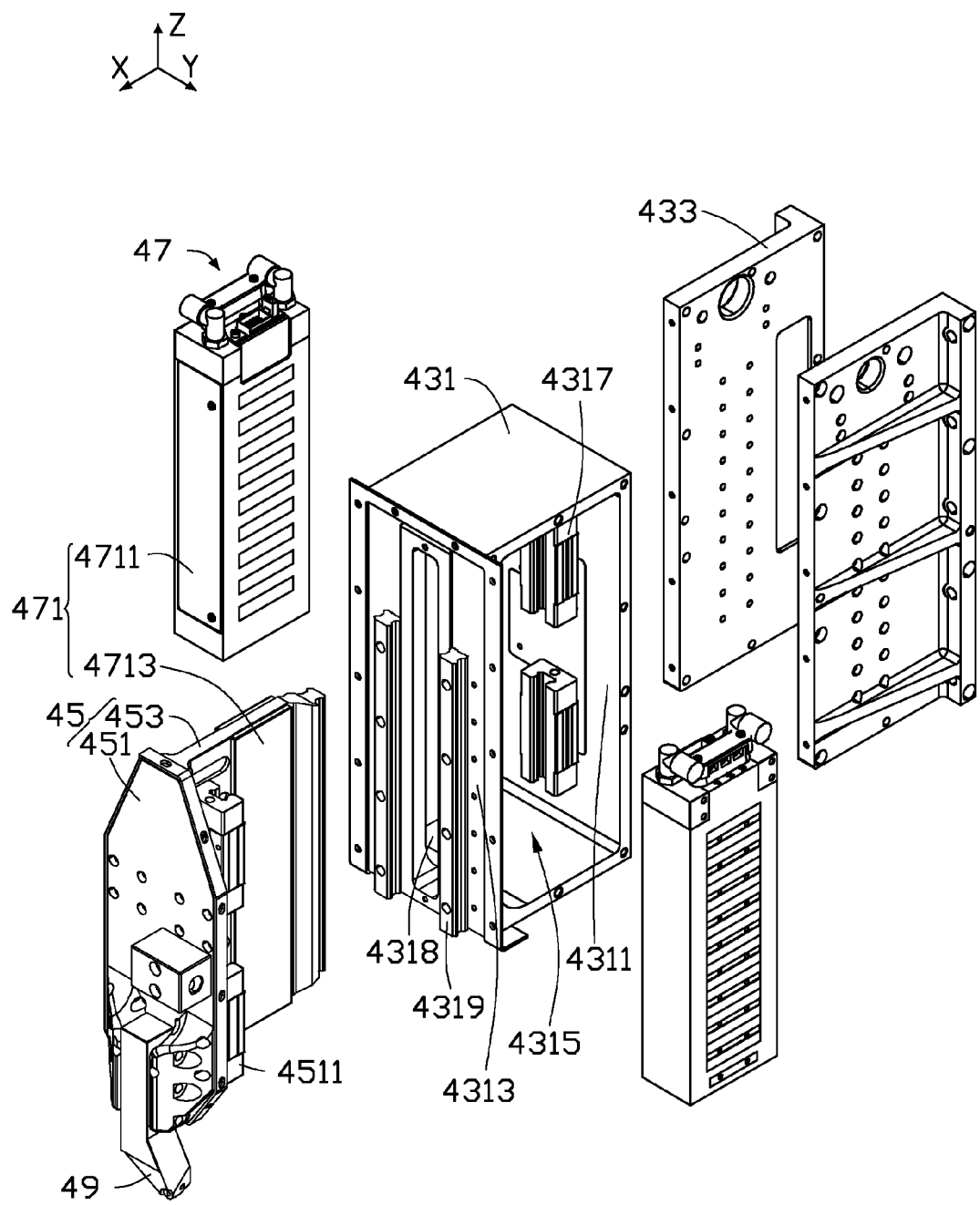
FIG. 4 is an exploded, isometric view of the lathe feeding mechanism of FIG. 3.

FIGS. 3 to 4 show the lathe feeding mechanism 40 slidably positioned on the cross beam 31. The lathe feeding mechanism 40 includes a sliding saddle 41 (see FIG. 2), a mounting seat 43, a tool holder 45, a pair of feeding assemblies 47, and a lathe tool 49. The sliding saddle 41 is assembled to the cross beam 31, and movably engages with the pair of second sliding rails 311. The sliding saddle 41 is driven by the second driving mechanism 37 to slide along the Y-axis direction together with the lathe feeding mechanism 40 and the miller feeding mechanism 50. The mounting seat 43 is fitted to the sliding saddle 41, away from the cross beam 31. The sliding saddle 41 is equipped with four guiding rails 413 extending along the Z-axis direction. The four guiding rails 413 are divided into two pairs spaced from each other. The sliding saddle 41 further includes a mounting block 415 adjacent to the base 11. The mounting block 415 is located between the two sets of guiding rails 413. The mounting seat 43 is assembled to the sliding saddle 41, adjacent to the four guiding rails 413.

The mounting seat 43 includes a frame 431 and two mounting boards 433 assembled to opposite sides, respectively, of the frame 431. The frame 431 includes a first side wall 4311 and a second side wall 4313. The first side wall 4311 and the second side wall 4313 are substantially parallel to each other and cooperatively define a receiving space 4315. The first side wall 4311 is slidably connected to the sliding saddle 41. Two separate guiding portions 4317 protrude from an inner surface of the first side wall 4311 toward the second side wall 4313 and extend substantially parallel to the Z-axis. A through groove 4318 is defined in the second side wall 4313 and extends along a direction substantially parallel to the Z-axis corresponding to the guiding portions 4317. Two sliding portions 4319 protrude from an outer surface of the second side wall 4313 at two sides of the through groove 4318. In the illustrated embodiment, the sliding portions 4319 are sliding rails, and the frame 431 is integrally formed. The two mounting boards 433 are installed on two opening sides of the frame 431. Each mounting board 433 is connected substantially perpendicularly between the first wall 4311 and the second side wall 4313 to close the two opening sides of the frame 431.

The tool holder 45 slidably connects with the mounting seat 43. The tool holder 45 is substantially "T" shaped, and includes a main body 451 and a sliding board 453 protruding substantially perpendicularly from the main body 451. The main body 451 is tapered at both ends, and is positioned outside of the mounting seat 43. Two distanced holding portions 4511 are positioned on a surface of the main body 451 facing the sliding board 453. The two holding portions 4511 slidably engage with the pair of sliding portions 4319 of the mounting seat 43. The sliding board 453 passes through the through groove 4318 and is slidably assembled to the two guiding portions 4317, dividing the receiving space 4315 into two parts.

The pair of feeding assemblies 47 is mounted in the mounting seat 43, and includes two drivers 471 electrically connected to the controller 60. The two drivers 471 drive the tool holder 45 in reciprocating motion at high speed along the Z-axis direction relative to the guiding portions 4317 and the sliding portions 4319. The two drivers 471 are received in the receiving space 4315 and are positioned on two sides of the sliding board 453. In the illustrated embodiment, the drivers 471 are linear motors. Each driver 471 includes a forcer 4711 and a stator 4713. Each forcer 4711 is fixed to a surface of a corresponding mounting board 433. The sliding board 453 is positioned between the two forcers 4711. The two stators 4713 are positioned on the opposite surfaces of the sliding board 453. In other embodiments, the number of drivers 471 may be set according to application.

The lathe tool 49 is fixedly assembled to the main body 451 of the tool holder 4511, adjacent to the base 11.

The miller feeding mechanism 50 includes a linear driving assembly 53, a linking board 54, a rotatable driving member 55, and a milling cutter 57. The linear driving assembly 53 includes a driving member 531, a screw leading rod 533, and a nut 535. The driving member 531 is mounted on the sliding saddle 43 above the cross beam 31. The screw leading rod 533 interconnects the driving member 531 and the mounting block 415. The nut 535 is sleeved on the screw leading rod 533 and engages with the screw leading rod 533. The linking board 54 is slidably assembled to the two sets of guiding rails 413 and is fixed to the nut 535. The rotatable driving member 55 is assembled to a side surface of the linking board 54 opposite to the screw leading rod 533. The milling cutter 57 is mounted on an end of the rotatable driving member 55, adjacent to the base 11.

The driving member 531 rotates the screw leading rod 533 and drives the linking board 54, the rotatable driving member 55, and the milling cutter 57 to slide along the Z-axis direction. The rotatable driving member 55 rotates the milling cutter 57 against the metallic member 300. The milling cutter 57 is driven by the cross beam 31 to move along the X-axis direction or the Y-axis direction, and is driven by the linear driving assembly 53 to move along Z-axis direction.

In assembly, the worktable 20 is positioned between the two support bodies 13. The cross beam 31 is installed on the two support bodies 13 via the pair of sliding bases 33. The pair of first driving mechanisms 35 and the second driving mechanism 37 are mounted on the base 11 and the cross beam 31, respectively. The lathe feeding mechanism 40 and the miller feeding mechanism 50 are mounted to the cross beam 31 adjacent to each other. The worktable 20, the moving device 30, the lathe feeding mechanism 40, and the miller feeding mechanism 50 are electrically connected to the controller 60.

Figure 6:
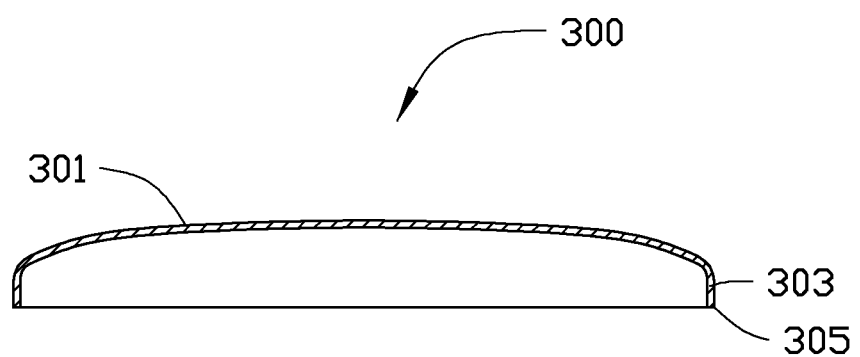
FIG. 6 is a cross-sectional view of the metallic member of FIG. 5, taken along line VI-VI.

Referring to FIGS. 5 and 6, the metallic member 300 to be machined is a housing of a tablet computer or a mobile phone. The metallic member 300 is substantially rectangular, and includes a top portion 301 and a peripheral sidewall 303 extending from a peripheral edge of the top portion 301. The top portion 301 has a slightly curved surface, and has a greater surface area than the peripheral sidewall 303. In the embodiment, the peripheral sidewall 303 has four side surfaces 3031, and every two adjacent side surfaces 3031 are connected by a corner 3033. The four side surfaces 3031 are substantially flat surfaces. The peripheral sidewall 303 further includes an end edge 305 away from the top portion 301.

Figure 7:
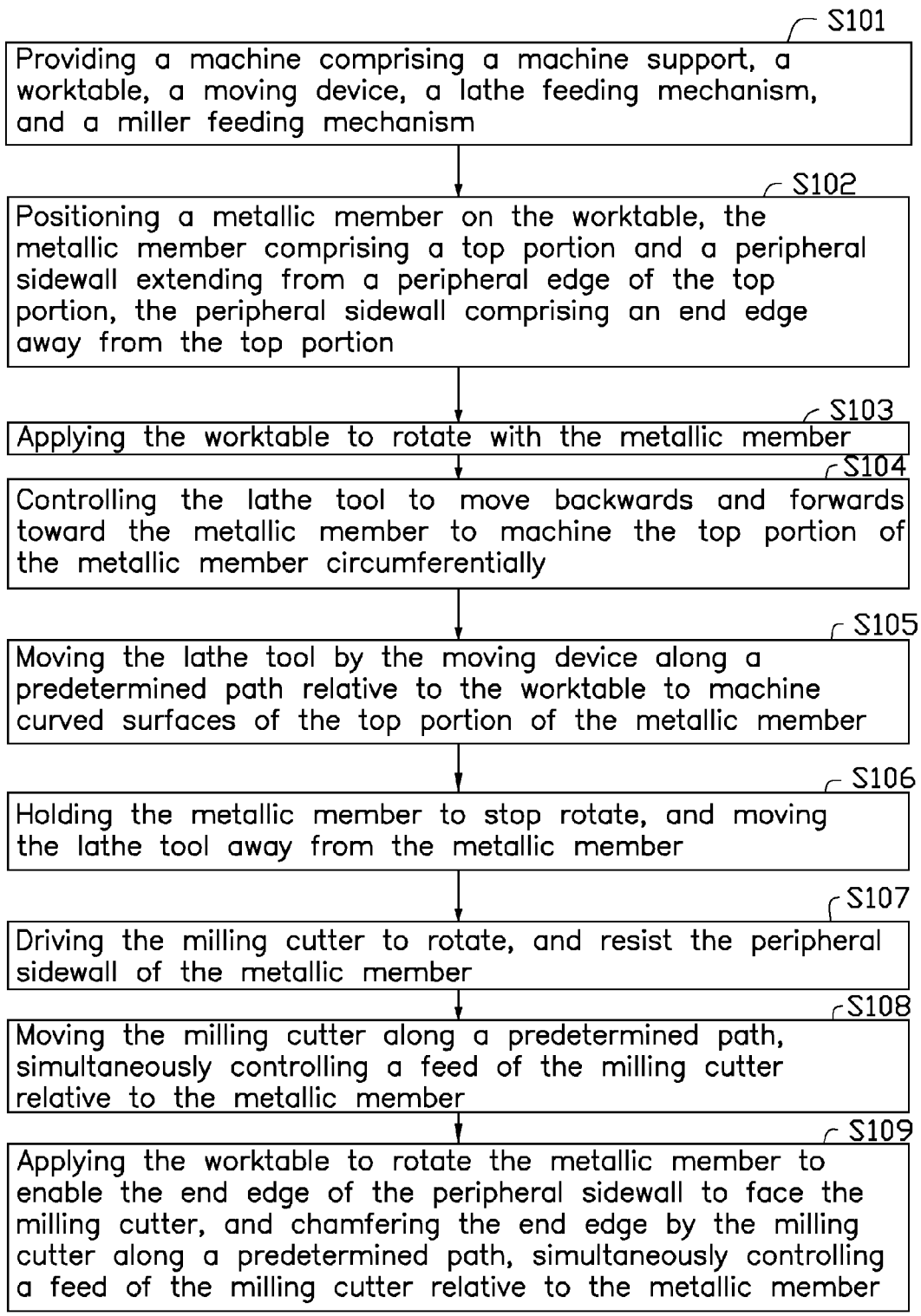
FIG. 7 is a flow chart of a first embodiment of a method for machining the metallic member.

Referring to FIG. 7, an embodiment of a method for machining the metallic member includes steps as follows:

In step S101: a machine 100 is provided. The machine 100 includes a worktable 20, a lathe feeding mechanism 40, and a miller feeding mechanism 50. The lathe feeding mechanism 40 includes a lathe tool 49, and the miller feeding mechanism 50 includes a milling cutter 57. In the embodiment, the machine 100 is provided as previously described.

In step S102: a metallic member 300 is placed and held on the worktable 20 of the machine 100. The metallic member 300 includes a top portion 301 and a peripheral sidewall 303 extending from a peripheral edge of the top portion 301. The peripheral sidewall 303 includes an end edge 305 away from the top portion 301.

In step S103: the worktable 20 rotates the metallic member 300. In the embodiment, the metallic member 300 is rotated around the $\beta$ axis by the second rotating member 27;

In step S104: the lathe feeding mechanism 40 drives the lathe tool 49 in a high frequency reciprocating motion to machine the top portion 301 of the metallic member 300. In detail, firstly, the pair of first driving mechanisms 35 drives the cross beam 31 to slide along the X-axis direction, and the second driving mechanism 37 drives the lathe feeding mechanism 40 to move along the Y-axis direction, until the lathe tool 49 arrives at an original position above the worktable 20 for machining. In the embodiment, the original position is located above a middle portion of the metallic member 300. Finally, the pair of feeding assemblies 47 drives the lathe tool 49 to move at a high speed along the Z-axis direction according to a depth of cutting required for each machining portion of the top portion 301.

In step S105: the lathe feeding mechanism 40 moves along a predetermined path relative to the worktable 20. The first driving mechanism 35 drives the feeding mechanism 40 to move along the X-axis direction via the cross beam 31, such that the rotary lathe tool 49 moves radially across the rotary metallic member 300 for machining curved surfaces on the top portion 301.

In step S106: the worktable 20 stops rotating the metallic member 300, and the lathe tool 49 is moved away from the metallic member 300.

In step S107: the miller feeding mechanism 50 drives the milling cutter 57 to rotate and resist the peripheral sidewall 303 of the metallic member 300. In detail, firstly, the pair of first driving mechanisms 35 drives the cross beam 31 to slide along the X-axis direction, and the second driving mechanism 37 drives the lathe feeding mechanism 40 to move along the Y-axis direction, such that the milling cutter 57 moves toward one first sliding rail 131 and arrives at a position above an end of one side surface 3031 of the peripheral sidewall 303. Secondly, the rotatable driving member 55 drives the milling cutter 57 to rotate. Finally, the linear driving assembly 53 drives the milling cutter 57 to slide along the two sets of guiding rails 413 until the milling cutter 57 meets the peripheral sidewall 303 of the metallic member 300.

In step S108: the miller feeding mechanism 50 moves along a predetermined path and controls a feed of the milling cutter 57 relative to the metallic member 300. In detail, the pair of first driving mechanisms 35 drives the cross beam 31 to slide along the X-axis direction to enable the milling cutter 57 to mill one side surface 3031 of the peripheral sidewall 303. When milling of the side surface 3031 is finished, the milling cutter 57 arrives at a corner 3033. At this time, the second rotating member 27 rotates the metallic member 300 around the $\beta$ axis until a side surface 3031 adjacent to the milled side surface 3031 is parallel to the first sliding rail 131.

In the rotating process, the milling cutter 57 is driven by the first driving mechanisms 35 and the second driving mechanisms 37 to change a position relative to the metallic member 300, and the milling cutter 57 machines the corners 3033 during the rotation. When the next side surface 3031 of the peripheral sidewall 303 is rotated to a position parallel to the pair of first sliding rails 131, the pair of first driving mechanisms 35 drives the cross beam 31 to slide along the X-axis direction to enable the milling cutter 57 to mill the next side surface 3031. During milling, the feeding mechanism 50 moves along the predetermined path, and the rotatable driving member 55 controls a feed of the milling cutter 57 relative to the metallic member 300 along the Z-axis direction. In another embodiment, the metallic member 300 is fixed to the worktable 20, such that when the milling cutter 57 arrives at a corner 3033, the milling cutter 57 is driven by the first driving mechanisms 35 and the second driving mechanisms 37 to change position relative to the metallic member 300. During the rotating process, the milling cutter 59 machines the corner 3033 until it arrives at the next side surface 3031 of the metallic member 300. Then, the milling cutter 57 mills the next side surface 3031 of the peripheral sidewall 303 by a similar process.

In step S109: the worktable 20 rotates the metallic member 300, such that the end edge 305 of the peripheral sidewall 303 faces the milling cutter 57. The miller feeding mechanism 50 chamfers the end edge 305 along a predetermined path and controls a feed of the milling cutter 57 relative to the metallic member 300. In detail, the first rotating member 23 rotates the metallic member 300 along the $\alpha$ axis, such that the end edge 305 on one side surface 3031 faces the milling cutter 57, and the miller feeding mechanism 50 chamfers the end edge 305. When finishing chamfering the end edge 305 on one side surface 3031, the first rotating member 23 rotates the metallic member 300 along the $\alpha$ axis, and the second rotating member 27 rotates the metallic member 300 along the $\beta$ axis to change a position of the metallic member 300 relative to the milling cutter 57, until the milling cutter 57 arrives at a side surface 3031 adjacent to the side surface 3031 having the milled end edge 305. Then, the first rotating member 23 rotates the metallic member 300 along the $\alpha$ axis to enable the end edge 305 on the next side surface 3031 to face the milling cutter 57, such that the milling cutter 57 chamfers the end edge 305 without interruption. A third rotating member 29 may be employed to rotate the metallic member 300 along a $\gamma$ axis perpendicular to the $\alpha$ and the $\beta$ axes. The first rotating member 21 is assembled to the third rotating member 29. When chamfering, the first rotating member 23 rotates the metallic member 300 along the $\alpha$ axis, such that the end edge 305 on one side surface 3031 faces the milling cutter 57, and the miller feeding mechanism 50 chamfers the end edge 305. When finishing the chamfering of the end edge 305 on one side surface 3031, the first rotating member 23 rotates the metallic member 300 along the $\alpha$ axis, the milling cutter 57 moves to a next side surface 3031, and the third rotating member 29 rotates the metallic member 300 along the $\gamma$ axis to change a position of the metallic member 300 relative to the milling cutter 57, until the end edge 305 on the adjacent surface 3031 faces the milling cutter 57. Then, the miller feeding mechanism 50 chamfers the end edge 305 on the next side surface 3031. In the embodiment, the metallic member 300 does not need to rotate along the $\beta$ axis. The worktable 20 rotates the metallic member 300 to allow the milling cutter 57 to machine other portions of the metallic member 300.

When only the peripheral sidewall 303 of the metallic member 300 needs to be machined, step 103 to step 106 may be omitted. The miller feeding mechanism 50 chamfers the end edge 305 of the metallic member 300, and then carries out milling of the peripheral sidewall 303.

Figure 8:
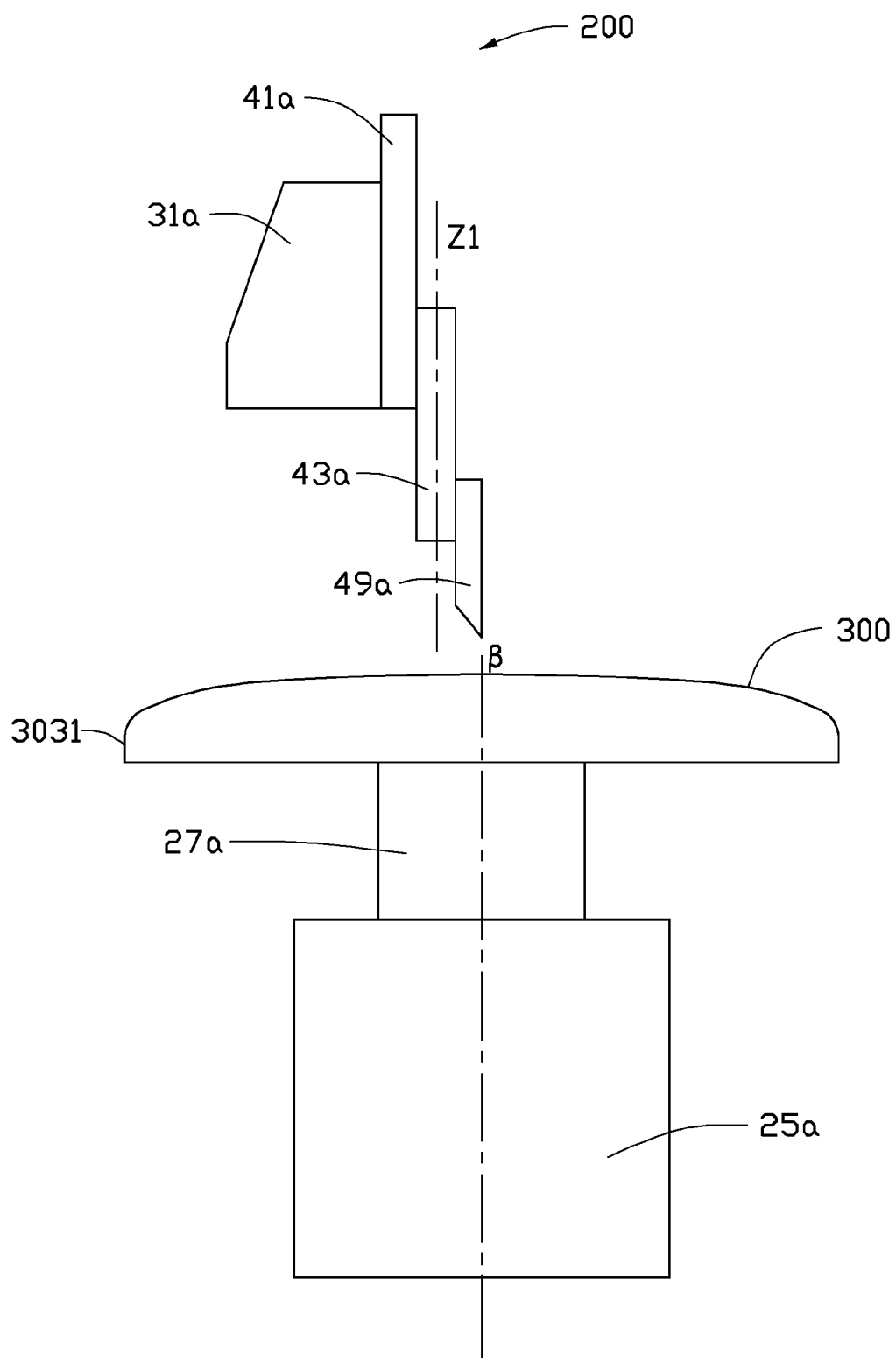
FIG. 8 is a schematic view of a second embodiment of the machine with a part thereof removed.

Referring to FIG. 8, a second embodiment of a machine 200 is employed for machining the metallic member 300. The machine 200 is similar to the machine 100 in structure, except that a sliding saddle 41a is slidably assembled to a cross beam 31a, and a second rotating member 27a is mounted on a rotating table 25a. The metallic member 300 is placed and held on the second rotating member 27a. The difference between the machine 200 and the machine 100 is that, a mounting seat 43a of the machine 200 is slidably mounted on the sliding saddle 41a and is capable of sliding along the Z1-axis direction relative to the sliding saddle 41a, and a lathe tool 49 is slidably mounted on the mounting seat 43a.

When the lathe feeding mechanism 40 is to machine the top portion 301 of the metallic member 300, the pair of first driving mechanisms 35 drives the cross beam 31 to slide along the X-axis direction, and the second driving mechanism 37 drives the lathe feeding mechanism 40 to move along the Y-axis direction, such that the lathe tool 49a arrives at an original position above the worktable 20 for machining. Then, the mounting seat 43a drives the lathe tool 49a to move down along the Z1-axis to reach a predetermined position near the middle portion of the metallic member 300. Finally, the pair of feeding assemblies 47 drives the lathe tool 49a to move at a high speed along the Z-axis according to the depth of cutting required for each machining portion of the top portion 301. Because the mounting seat 43a can slide along the Z1-axis to position the lathe tool 49a at the preset position, a reciprocating distance of movement of the lathe tool 49a relative to the metallic member 300 can be reduced, thereby enhancing a reaction response of the lathe tool 49a.

Accordingly, in the second embodiment of the method for machining the metallic member 300, after driving the cross beam 31 to slide along the Y-axis by the second driving mechanisms 37, a sub-step of moving the mounting seat 43a downward along the Z1-axis direction to reach a preset position is interposed.

The miller feeding mechanism 50 mills the peripheral sidewall 303 of the metallic member 300 before the lathe feeding mechanism 40 machines the top portion 301. The miller feeding mechanism 50 is not assembled to the sliding saddle 41, but is assembled to a sliding plate (not shown) slidably mounted on the pair of second guiding rails 311, such that the lathe feeding mechanism 40 and the miller feeding mechanism 50 may be controlled independently.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. A milling method for machining metallic member, comprising:
    (1) providing a machine comprising a machine support, a worktable, a moving device, and a miller feeding mechanism, wherein the worktable is positioned on the machine support; the moving device is slidably assembled to the machine support along a first direction and located above the worktable, the miller feeding mechanism is slidably assembled to the moving device along a second direction perpendicular to the first direction, the miller feeding mechanism comprises a milling cutter and is configured for driving the milling cutter to move along a third direction perpendicular to the first and the second directions, the worktable comprises a first rotating member and a second rotating member, the first rotating member is mounted on the machine support, the second rotating member is mounted on the first rotating member, the second rotating member is capable of rotating the metallic member along the third direction accompanying with the motion of the milling cutter, thereby cooperatively adjusting a position of the milling cutter relative to the metallic member, the worktable further comprises a third rotating member, and the first rotating member is mounted on the third rotating member;
    (2) positioning a metallic member on the worktable, the metallic member comprising a top portion and a peripheral sidewall extending from a peripheral edge of the top portion, the peripheral sidewall comprising an end edge away from the top portion and a plurality of side surfaces arranged in order, and two adjacent side surfaces of the plurality of side surfaces connected by a corner;
    (3) driving the milling cutter to rotate, and resist the peripheral sidewall of the metallic member;
    (4) moving the milling cutter along a predetermined path, simultaneously controlling a feed of the milling cutter relative to the metallic member; and
    (5) applying the worktable to rotate the metallic member to enable the end edge of the peripheral sidewall to face the milling cutter, and chamfering the end edge by the milling cutter along a predetermined path, simultaneously controlling a feed of the milling cutter relative to the metallic member, wherein the first rotating member rotates the metallic member along the second direction upward to enable the end edge on one side surface to face the milling cutter, the miller feeding mechanism chamfers the end edge, when finishing chamfering the end edge on the side surface, the first rotating member rotates the metallic member along the second direction downward, then the milling cutter moves to an adjacent side surface to the side surface which the milled end edge located on, the third rotating member rotates the metallic member along the first direction to change position of the metallic member relative to the milling cutter, until the end edge on the adjacent surface face the milling cutter, such that the milling cutter chamfers the end edge.

2. The method of claim 1, wherein the peripheral sidewall comprises a plurality of side surfaces arranged in order and adjacent two of the plurality of side surfaces is connected by a corner, step (4) further comprises when the milling cutter finishes milling one side surface, the milling cutter arrives at one corner of the peripheral sidewall, the moving device drives the milling tool mechanism to move along the first direction and the second direction to adjust a position of the milling cutter relative to the metallic member, until the milling cutter arrives at an adjacent side surface to the side surface that has been milled.

3. The method of claim 2, further comprising, while adjusting the position of the milling cutter relative to the metallic member, continuing machining the corner until the milling cutter arrives at the adjacent side surface, and followed by repeating the machining steps on the adjacent side surface.

4. The method of claim 1, wherein step (4) further comprises when the milling cutter finishes milling one side surface, the milling cutter arrives at one corner of the peripheral sidewall, the moving device drives the milling tool mechanism to move along the first direction and the second direction, simultaneously rotating the metallic member with the worktable, thereby cooperatively adjusting a position of the milling cutter relative to the metallic member, then the milling cutter arrives at an adjacent side surface to the side surface that has been milled.

5. The method of claim 4, wherein in the process of adjusting the position of the milling cutter relative to the metallic member, the milling cutter machines the corner till the milling cutter arrives at the adjacent side surface, and followed by repeating the machining steps on the adjacent side surface.

6. The method of claim 4, wherein in the step (5), the first rotating member rotates the metallic member along the second direction upward to enable the end edge on one side surface to face the milling cutter, the miller feeding mechanism chamfers the end edge, when finishing chamfering the end edge on one side surface, the first rotating member rotates the metallic member along the second direction downward, the second rotating member rotates the metallic member along the third direction to change position of the metallic member relative to the milling cutter, until the milling cutter arrives at an adjacent side surface to the side surface which the milled end edge located on, then the first rotating member rotates the metallic member along the second direction upward to enable the end edge on the adjacent side surface to face the milling cutter, such that the milling cutter chamfers the end edge.

7. The method of claim 1, wherein the miller feeding mechanism comprises a linear driving assembly mounted on the moving device, the linear driving assembly drives the milling cutter to move along the third direction to adjust the feed of the milling cutter relative to the metallic member.

8. The method of claim 7, wherein the machine further comprises a sliding saddle slidably connected to the moving device along the second direction, the miller feeding mechanism further comprises a linking board, and a rotatable driving member configured for rotating the milling cutter, the linear driving assembly is mounted on the sliding saddle, the linking board is slidably assembled to the sliding saddle along the third direction and driven by the linear driving assembly, the rotatable driving member is mounted on a side of the linking board, and the milling cutter is mounted an end of the rotatable driving member.

9. A milling method for machining metallic member, comprising:

(1) providing a machine comprising a machine support, a worktable, a moving device, and a miller feeding mechanism, wherein the worktable is positioned on the machine support; the moving device is slidably assembled to the machine support along a first direction and located above the worktable, the miller feeding mechanism is slidably assembled to the moving device along a second direction perpendicular to the first direction, the miller feeding mechanism comprises a milling cutter and is configured for driving the milling cutter to move along a third direction perpendicular to the first and the second directions, the worktable comprises a first rotating member and a second rotating member, the first rotating member is mounted on the machine support, the second rotating member is mounted on the first rotating member, the second rotating member is capable of rotating the metallic member along the third direction to match up the motion of the milling cutter, thereby cooperatively adjusting a position of the milling cutter relative to the metallic member, the worktable further comprises a third rotating member, and the first rotating member is mounted on the third rotating member;

(2) positioning the metallic member on the worktable, the metallic member comprising a top portion and a peripheral sidewall extending from a peripheral edge of the top portion, the peripheral sidewall comprises an end edge away from the top portion, wherein the peripheral sidewall comprises a plurality of side surfaces arranged in order and a plurality of corners each connecting two adjacent side surfaces;

(3) driving the milling cutter to rotate, and resist the peripheral sidewall of the metallic member;

(4) applying the worktable to rotate the metallic member to enable the end edge of the peripheral sidewall to face the milling cutter, and chamfering the end edge along a predetermined path, simultaneously controlling a feed of the milling cutter relative to the metallic member wherein the first rotating member rotates the metallic member along the second direction upward to enable the end edge on one side surface to face the milling cutter, the miller feeding mechanism chamfers the end edge, when finishing chamfering the end edge on one side surface, the first rotating member rotates the metallic member along the second direction downward, then the milling cutter moves to an adjacent side surface to the side surface which the milled end edge located on, the third rotating member rotates the metallic member along the first direction to change position of the metallic member relative to the milling cutter, until the end edge on the adjacent surface face the milling cutter, such that the milling cutter chamfers the end edge; and (5) moving the milling cutter along a predetermined path to mill the peripheral sidewall, simultaneously controlling a feed of the milling cutter relative to the metallic member, wherein when the milling cutter finishes milling one side surface, it arrives at one corner of the peripheral sidewall, the moving device drives the milling tool mechanism to move along the first direction and the second direction, accompanying with the worktable drives the metallic member to rotate, thereby cooperatively adjusting a position of the milling cutter relative to the metallic member, then the milling cutter arrives at one adjacent side surface of the peripheral sidewall.

10. The method of claim 9, wherein the peripheral sidewall comprises a plurality of side surfaces arranged in order and a plurality of corners each connecting two adjacent side surfaces, in the step (5), when the milling cutter finishes milling one side surface, it arrives at one corner of the peripheral sidewall, the moving device drives the milling tool mechanism to move along the first direction and the second direction to adjust a position of the milling cutter relative to the metallic member, until the milling cutter arrives at one adjacent side surface of the peripheral sidewall.

11. The method of claim 10, wherein in the process of adjusting the position of the milling cutter relative to the metallic member, the milling cutter machines the corner until the milling cutter arrives at the adjacent side surface, and then the milling cutter machines the adjacent side surface of the peripheral sidewall in the same way as previous one.

12. The method of claim 9, wherein in the process of adjusting the position of the milling cutter relative to the metallic member, the milling cutter machines the corner till it arrives at the adjacent side surface, and then the milling cutter machines the adjacent side surface of the peripheral sidewall in the same way as previous one.

13. The method of claim 12, wherein in the step (4), the first rotating member rotates the metallic member along the second direction upward to enable the end edge on one side surface to face the milling cutter, the miller feeding mechanism chamfers the end edge, when finishing chamfering the end edge on one side surface, the first rotating member rotates the metallic member along the second direction downward, the second rotating member rotates the metallic member along the third direction to change position of the metallic member relative to the milling cutter, until the milling cutter arrives at an adjacent side surface to the side surface which the milled end edge located on, then the first rotating member rotates the metallic member along the second direction upward to enable the end edge on the adjacent side surface to face the milling cutter, such that the milling cutter chamfers the end edge.

14. The method of claim 9, wherein the miller feeding mechanism comprises a linear driving assembly mounted on moving device, the linear driving assembly drives the milling cutter to move along the third direction to adjust the feed of the milling cutter relative to the metallic member.

15. The method of claim 14, wherein the machine further comprises a sliding saddle slidably connected to the moving device along the second direction, the miller feeding mechanism further comprises a linking board, and a rotatable driving member configured for rotating the milling cutter, the linear driving assembly is mounted on the sliding saddle, the linking board is slidably assembled to the sliding saddle along the third direction and driven by the linear driving assembly, the rotatable driving member is mounted on a side of the linking board, and the milling cutter is mounted an end of the rotatable driving member.

* * * * *